US011859834B2

(12) United States Patent
Schildt

(10) Patent No.: US 11,859,834 B2
(45) Date of Patent: Jan. 2, 2024

(54) MICRO-COMBINED HEAT AND POWER SYSTEM WITH EXTERIOR GENERATOR AND HEATING SYSTEM COMPATIBILITY AND METHOD OF USE

(71) Applicant: Axiom Energy Group, LLC, East Troy, WI (US)

(72) Inventor: Michael Schildt, Eagle, WI (US)

(73) Assignee: Axiom Energy Group, LLC, East Troy, WI (US)

(*) Notice: Subject to any disclaimer, the term of this patent is extended or adjusted under 35 U.S.C. 154(b) by 96 days.

(21) Appl. No.: 17/495,207

(22) Filed: Oct. 6, 2021

(65) Prior Publication Data

US 2022/0107095 A1 Apr. 7, 2022

Related U.S. Application Data

(60) Provisional application No. 63/088,701, filed on Oct. 7, 2020.

(51) Int. Cl.
*F24D 19/10* (2006.01)
*F24D 12/02* (2006.01)
(Continued)

(52) U.S. Cl.
CPC ......... *F24D 19/1084* (2013.01); *F24D 12/02* (2013.01); *F24D 19/1015* (2013.01);
(Continued)

(58) Field of Classification Search
CPC .......... F24H 7/04; F24H 2240/06; H02J 3/32; F24D 19/1084; F24D 12/02; F24D 19/1015; F24D 2200/26; F05D 2220/76
See application file for complete search history.

(56) References Cited

U.S. PATENT DOCUMENTS 2,189,895 A 2/1940 Grutzner
4,147,301 A * 4/1979 Halma ................... F24D 12/02
432/175
(Continued)

FOREIGN PATENT DOCUMENTS

CA 2562636 A1 * 11/2005 ............... F24D 5/02
CA 2544800 C * 8/2009 ............... F24D 5/02
(Continued)

*Primary Examiner* — Pedro J Cuevas
(74) *Attorney, Agent, or Firm* — Boyle Fredrickson S.C.

(57) ABSTRACT

A micro-combined heat and power (mCHP) system includes a liquid cooled variable speed genset that is located to the exterior of a building and that is provides heat and power to the interior of the building. The genset may be configured to output an electrical supply of between approximately between 500W and 40 kW. A coolant loop may extend from the exterior genset to the interior of a building and is configured to reclaim heat from one or more sources of waste heat at the engine, generator, oil and/or exhaust. The reclaimed heat is then transferred, directly or indirectly, to the air flow path of a building heating system. In one embodiment, the reclaimed heat is transferred to a liquid circuit via a liquid-to-liquid heat exchanger and thence to the cold air intake of a forced air furnace via a liquid-to-air heat exchanger. A thermostat may control heat transfer from the mCHP to the heating system.

19 Claims, 2 Drawing Sheets

(51) Int. Cl.
*F24H 7/04* (2006.01)
*H02J 3/32* (2006.01)
(52) U.S. Cl.
CPC ............... *F24H 7/04* (2013.01); *H02J 3/32* (2013.01); *F05D 2220/76* (2013.01); *F24D 2200/26* (2013.01); *F24H 2240/06* (2013.01); *H02J 2300/22* (2020.01); *H02J 2300/28* (2020.01)

(56) References Cited

U.S. PATENT DOCUMENTS

| | | | |
|---|---|---|---|
| 4,510,756 A | 4/1985 | Hise et al. | |
| 4,754,607 A * | 7/1988 | Mackay | F02C 7/08 60/737 |
| 5,713,320 A | 2/1998 | Pfaff et al. | |
| 5,775,581 A * | 7/1998 | Welden | F24D 12/02 237/61 |
| 6,672,064 B2 * | 1/2004 | Lawheed | F01C 3/00 60/641.11 |
| 7,040,544 B2 | 5/2006 | Guyer | |
| 7,210,467 B2 | 5/2007 | Kweon et al. | |
| 7,284,709 B2 * | 10/2007 | Guyer | F24D 12/02 60/39.01 |
| 8,360,014 B2 | 1/2013 | Ono et al. | |
| 9,429,018 B2 | 8/2016 | Zachary et al. | |
| 9,605,882 B2 * | 3/2017 | Hancock | F25B 49/02 |
| 9,664,140 B2 | 5/2017 | Kalika | |
| 9,803,584 B2 | 10/2017 | Schmalz | |
| 10,495,026 B2 * | 12/2019 | Wu | F02G 5/02 |
| 10,598,049 B2 | 3/2020 | Cocuzza et al. | |
| 2003/0213246 A1 | 11/2003 | Coll et al. | |
| 2003/0213248 A1 | 11/2003 | Osborne et al. | |
| 2005/0098643 A1 * | 5/2005 | Guyer | F24D 18/00 237/12.1 |
| 2005/0161521 A1 * | 7/2005 | Guyer | F24D 18/00 237/12.1 |
| 2008/0261093 A1 | 10/2008 | Kelly et al. | |
| 2009/0045625 A1 | 2/2009 | Yuri | |
| 2009/0121488 A1 * | 5/2009 | Bhatti | F01K 9/003 62/235.1 |
| 2015/0159928 A1 * | 6/2015 | Hancock | F25B 27/02 62/238.1 |
| 2018/0038311 A1 * | 2/2018 | Schmalz | F02B 43/02 |
| 2018/0156112 A1 | 6/2018 | Mohseni | |
| 2018/0372023 A1 * | 12/2018 | Wu | F02G 5/02 |

FOREIGN PATENT DOCUMENTS

| | | | |
|---|---|---|---|
| CA | 2562636 C * | 12/2011 | ............ F24D 12/02 |
| DE | 202012001522 | 3/2012 | |
| DE | 202015104634 | 10/2015 | |
| EP | 3077652 | 10/2017 | |
| EP | 2966365 | 4/2018 | |
| EP | 3230574 | 11/2018 | |
| EP | 3201532 | 1/2019 | |
| EP | 3124878 | 10/2019 | |
| GB | 2501708 | 6/2015 | |
| KR | 101183815 | 9/2012 | |
| KR | 10-2016-0001927 A | 1/2016 | |
| KR | 10-1680515 B1 | 11/2016 | |
| WO | WO-2005047776 A1 * | 5/2005 | ............ F24D 5/02 |
| WO | WO-2005106339 A1 * | 11/2005 | ............ F24D 12/02 |
| WO | WO-2011069263 A1 * | 6/2011 | ............ F01B 23/10 |
| WO | 2012-056190 A1 | 5/2012 | |
| WO | WO-2012120482 A1 * | 9/2012 | ............ F02B 75/24 |
| WO | 2017081248 | 5/2017 | |

* cited by examiner

MICRO-COMBINED HEAT AND POWER SYSTEM WITH EXTERIOR GENERATOR AND HEATING SYSTEM COMPATIBILITY AND METHOD OF USE

CROSS-REFERENCE TO RELATED APPLICATIONS

This application claims the benefit of the provisional patent application U.S. App. No. 63/088,701 filed on Oct. 7, 2020 and entitled "Micro-Combined Heat and Power System with Exterior Generator and Heating System Compatibility and Method of Use," the entire contents of which are hereby expressly incorporated by reference into the present application.

FIELD OF THE INVENTION

The invention relates to the field of micro-combined heat and power systems ("mCHPs") and, more particularly, relates to a mCHP system the captures heat from multiple sources of an exterior located generator with compatibility with a heating system such as a forced air furnace. The invention additionally relates to a method of using such a mCHP system and to a two-stage heating system and process employing both a mCHP and a forced air furnace or comparable heating system.

BACKGROUND OF THE INVENTION

Combined heat and power systems ("CHP") or cogeneration systems, which combine the concurrent production of electrical power and thermal energy, i.e., heat, from a common source of energy are enjoying increased popularity worldwide. Such systems typically include a prime mover, such as an internal combustion engine, an electrical generator that is driven by the engine, and a heat recovery system which recovers heat generated by the engine and/or generator. The electrical generator supplies electrical power, and the heat recovery system heats a fluid (typically water) that may be used as domestic hot water and/or as a source of heat in a water-to-air or a water-to-water heat exchanger. Cogeneration allows for a more efficient use of fuel through the recapture of thermal energy which otherwise would be discarded as waste by-product of the engine operation.

Traditional CHP systems often are installed in applications that require a substantial electrical demand, such as industrial applications, large office buildings, hotels, multi-unit housing, etc. In such applications, the traditional CHP system is integrated into the existing electrical supply grid, where operation of the CHP resulting in the generation of electricity that exceeds local demand may be sold back into the electrical grid. However, such traditional CHP units are not well configured for smaller applications that require electrical generation of less than 5 kW due to their size and cost.

In contrast, "micro combined heat and power" systems or "mCHP" systems, which typically generate less than 5 kW, are well-suited for use in applications such as a single-family home, a small business, or a relatively small network of the same. However, mCHP systems are traditionally installed within an interior of a building structure, such as home or business, where they can then be integrated with peripheral devices such as water storage tanks and distribution equipment. Integration of such a system into the existing electrical grid is generally thought to provide a source of revenue for mCHP owners who can sell power to the power companies when supply exceeds demand. Grid access also provides electric current for use when starting the mCHP engine and as a back-up electrical source were the mCHP to fail. However, such mCHP systems require a significant available indoor footprint, which may be unavailable for buildings with an existing HVAC system, such as a forced air furnace.

Accordingly, it would be advantageous to have a mCHP system that includes a generator unit that is located at an exterior of a building, as to minimize the required interior footprint of the mCHP system Additionally, traditional mCHP systems are not well configured to integrate into a building with an existing heating system, such as a forced air furnace. Accordingly, it would also be advantageous to utilize the captured thermal energy which would otherwise be discarded as a waste by-product of the engine operation during electrical power production as a source of heat that replaces, supplements, or is supplemented by the heat that can be provided by a furnace or other heater.

The need therefore exists to provide a mCHP system with an exterior generator that reduces the interior footprint of the mCHP system, i.e., the space within the subject building that is occupied by the mCHP system.

The need additionally exists to use the heat recovered by a mCHP to replace, supplement, or be supplemented by the heat that can be provided by a furnace or other heater.

SUMMARY OF THE INVENTION

In accordance with a first aspect of the invention, a mCHP system may include an exterior, i.e., outdoor, located genset that meets the cogeneration demands of a structure such as a residential home. The genset may be configured to output an electrical supply of approximately between 0.5 kW and 5.0 kW, and more typically between 1.2 kW and 4.4 kW. The genset may be a liquid-cooled, variable speed genset. The mCHP additionally includes a coolant loop that receives heat from the genset, and a liquid circuit that is heated by the coolant loop and supplies that heated liquid, typically water, to a liquid to air heat exchanger that exchanges heat with an airstream used to heat the structure. The heat exchanger may, for instance, be located in the air supply of a forced air furnace. In one configuration, the coolant is configured to reclaim heat from one or more sources of waste heat at the engine, generator, oil and/or exhaust. Reclaimed heat is then transferred to the indoor liquid circuit and thence to the fluid flow path of a heating system, such as to the cold air intake of a forced air furnace.

In addition, the mCHP system may further comprise a liquid storage tank having at least one temperature sensor generating a temperature signal to regulate the flow of liquid (typically water) through a coolant-to-liquid heat exchanger.

In addition, the mCHP system may include a controller that regulates the activation and/or speed of the genset in response to a temperature signal from the at least one temperature sensor in the storage tank.

In addition, the thermostat may control activation of the heating system when the thermal demand of the building exceeds the thermal output of the liquid-to-air heat exchanger.

Also disclosed is a method of operating such a mCHP system.

These and other aspects, advantages, and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof. It is hereby disclosed that the invention includes all such modifications.

BRIEF DESCRIPTION OF THE DRAWINGS

Preferred exemplary embodiments of the invention are illustrated in the accompanying drawing in which.

Figure 1:
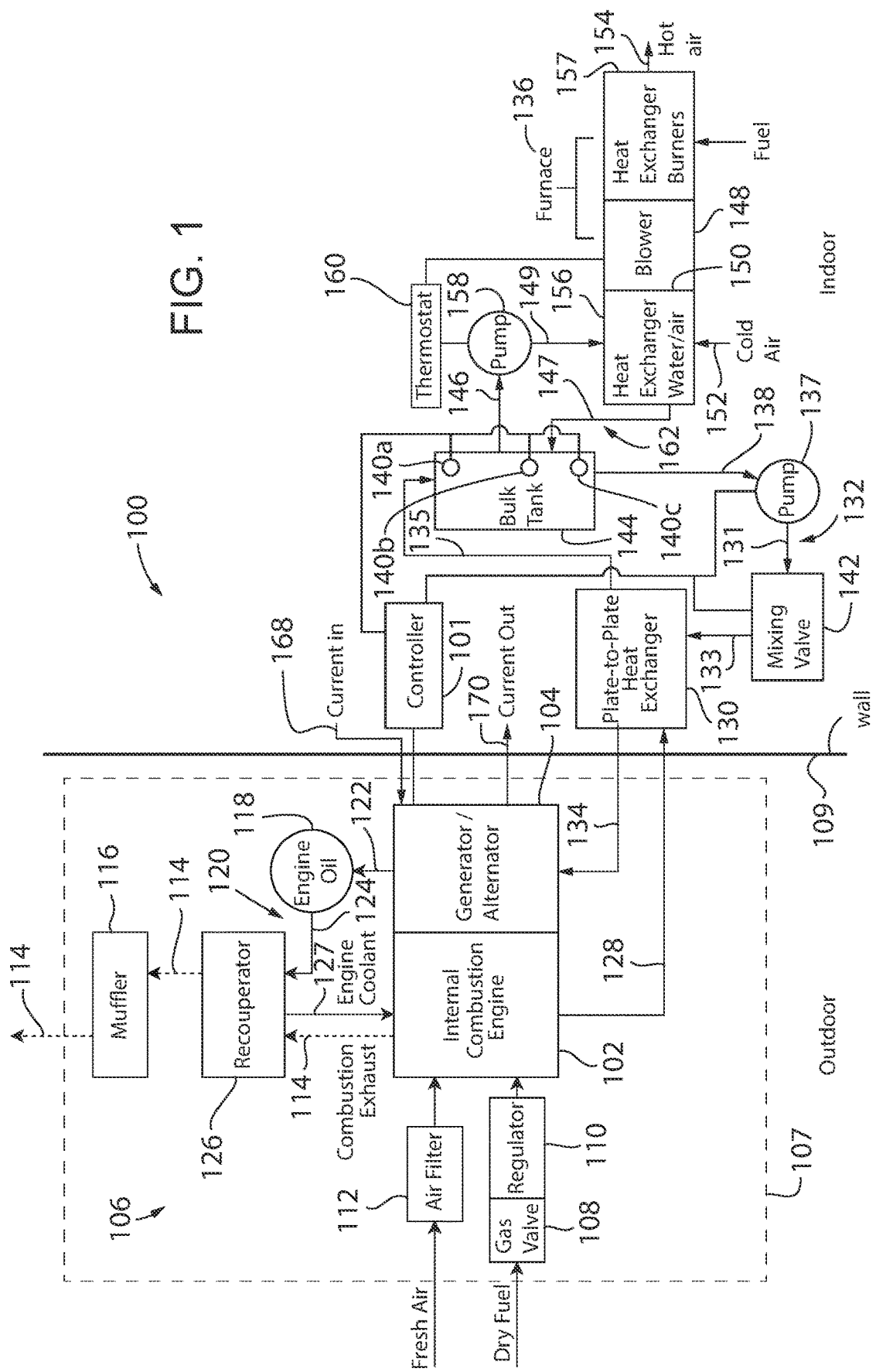
FIG. 1 is a schematic diagram of a mCHP system constructed in accordance with one embodiment of the present invention.

Before the embodiments of the invention are explained in detail, it is to be understood that the invention is not limited in its application to the details of construction and the arrangement of the components set forth in the following description or illustrated in the drawings. The invention is capable of other embodiments and of being practiced or carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION

Referring to FIG. 1, a micro-combined heat and power ("mCHP") system 100 constructed in accordance with one embodiment of the present invention is shown in schematic form. System 100, as shown in FIG. 1 and described generally below is configured to be integrated into an existing power grid. However, it is also considered within the scope of the present invention that the system 100 may be located off-grid, i.e., it need not be connected to an electrical power grid. The mCHP 100 is configured to supply electricity and heat to a single building such as a home or a commercial building and also to supply heat to a fluid flow path of a heating system in the building. The mCHP 100 comprises a generator set or "genset" 106 including an engine 102 and a generator 104, a coolant loop 120 and related components 130, 137, 142, 144 for heating a liquid such as water, and a programmable microcontroller or "electronic control unit" ECU 101 that controls system operation.

The ECU 101 may control both the entire system including the genset 106 and the furnace 136 or, alternatively, may communicate with other ECUs (not shown) controlling the engine 102 and the furnace 136. The mCHP system 100 is a "split" system in which at least the genset 106 is disposed externally of the building's exterior wall 109. Positioning the genset 106 outside of the building reduces the "footprint" or physical space occupied by the system 100 within the building, facilitates installation of the genset 106 in negating the need to install large components in tight spaces, facilitates maintenance of the genset in negating the need to permit access to the interior of the building, and reduces the transmission of noise to the interior of the building during operation.

Genset 106 may be located within an exterior housing or enclosure 107 that is configured to protect the genset 106 from adverse operating conditions such as rain or snow, suppress the sound of the operating genset 106, and provide sufficient ventilation for optimal operation of the genset 106. System 100 also includes a coolant loop 120 that is primarily located within the enclosure 107 and that is configured to progressively heat coolant by heat exchange from the engine 102, the stator housing of the generator 104, the engine's oil supply system, and the engine's exhaust system. Once heated, the coolant loop 120 travels through the exterior wall 109, into the interior of the building where a liquid-to-liquid heat exchanger 130 is provided for transferring heat from the hot coolant to a liquid, typically water, that may be used for as a source of heat via incorporation into a forced air furnace 136. While, not illustrated in FIG. 1, the heated water from the liquid-to-liquid heat exchanger 130 may also provide a source of domestic hot water for use in the building. Electricity generated by the system 100 can be used to directly satisfy the building(s) energy load(s), be stored for future use and/or fed into an electrical power grid, if one is present.

As is typical, the genset 106 includes an engine 102 and a generator/alternator 104. The engine 102, is preferably an internal combustion engine, but may be any alternative form of prime mover. The engine 102 may be a single-cylinder, approximately 8-HP internal combustion dual-fuel engine that is configured to run on either natural gas or propane without requiring mechanical modification to switch between fuels. Both these fuels are widely available in regions lacking reliable electric power grids. Alternatively, the engine 102 may also be a single fuel engine and/or configured to run on any of a variety of fuels such as gasoline, diesel fuel, kerosene, biofuel, etc. In this embodiment, the approximately 8-HP engine 102 provides approximately 40,000 to 50,000 BTU of heat to air being supplied to a forced air furnace 136 as will be described in further detail below, when the engine 102 is fueled by natural gas and is running at an electrical generation output of approximately 5 kW. However, it should be considered to be well within the scope of the present invention that the engine and the genset as a whole may be of larger capacity such that the reclaimed heat output from the internal combustion engine 102 may further provide approximately: 51,000 to 100,000 BTU of heat when the genset 106 is configured to output approximately 10 kW of electricity; 101,000 to 150,000 BTUs of heat when outputting approximately 15 kW of electricity; 151,000 to 200,000 BTU of heat when outputting approximately 20 kW; 201,000 to 250,000 BTU of heat when outputting approximately 25 kW of electricity; 251,000 to 300,000 BTU of heat when outputting approximately 30 kW of electricity; 301,000 to 350,000 BTU of heat when outputting approximately 35 kW of heat; and, 351,000 to 400,000 BTU when outputting approximately 40 kW of electricity.

More preferably, the engine 102 is configured to have a long-running lifespan of greater than approximately 40,000 operating hours and has relatively low maintenance requirements, with maintenance intervals of approximately 4,000 hours. Such a long run life and relatively infrequent maintenance is of significant importance in remote applications of the mCHP system 100, where routine service may be unavailable.

The engine 102 may be a variable-speed engine. Accordingly, modulating the running speed of the engine 102 between approximately 1,200 RPM and 3,400 RPM results in a corresponding electrical power generation of an approximately between 1.2 kW and 4.4 kW, respectively. As a result of modulating the speed of the engine 102 under direct or indirect control of the microcontroller 101, the genset's electrical output can be varied to meet the electrical load placed on the mCHP system 100, thereby maximizing efficiency of the system 100, where either electrical storage and/or resale through a connected power grid is either undesirable or unavailable.

Fuel is supplied to the engine 102 via a gas valve 108 and regulator 110, which controls the flow of fuel into the engine 102. Atmospheric air is supplied to the engine 102 through the housing 107 and an air filter 112 at a variable rate that is typically of approximately 15 to 20 cubic feet per minute, depending upon engine speed. Heated exhaust gases exit the engine 102 through an exhaust system 114, which may have a muffler 116 disposed therein.

The engine 102 is lubricated via engine oil delivered from an oil reservoir 118 and circulated between the engine 102 and the oil reservoir 118 via a pump (not shown). A coolant loop 120, comprising a series of conduits, extends from the engine 102 as to allow engine coolant to flow throughout the mCHP system 100, thereby reducing the operating temperature of the engine 102 and simultaneously recapturing waste heat for heating a water source as will be described in further detail below. More specially, in the coolant loop 120, engine coolant enters stator housing of the generator 104 at a first temperature. Operation of the generator 104 heats the coolant to a second temperature. The coolant then flows from an outlet 122 to generator 104 to the oil reservoir 118. Heat from the engine oil contained within the reservoir 118 is transferred to the coolant, thereby heating the engine coolant to a third temperature. This heat transfer reduces the temperature of the engine oil in the oil reservoir 118. Meanwhile, the heated coolant passes from the oil reservoir 118 via a conduit 124 and flows into a gas-to-liquid heat exchanger such as a thermal recuperator 126. The recuperator 126 may be a shell and tube exchanger comprising a liquid coolant filled shell containing a series of tubes through which the heated exhaust may travel. However, alternative heat exchanger configurations are within the scope of the present invention.

During use, the heated exhaust flowing from the engine 102 to the muffler 116 and through the exhaust outlet 114 passes through the tubes of the recuperator 126, heating the engine coolant flowing through the surrounding shell component to a fourth temperature.

A exhaust catalyst for reducing emissions in the exhaust may also be disposed at or in the recuperator 126 or elsewhere in the exhaust system, along with an oxygen sensor that provides data used by the controller 101 for controlling the fuel-to-air ratio of the engine 102. In this configuration, the recuperator 126 may also contain a catalytic converter or other exhaust treatment device as to reduce toxic gases and pollutants in the exhaust gas prior to entering the muffler 116.

The coolant at the fourth temperature then flows from the recuperator 126, via conduit 127 to the engine 102. Operation of the engine 102 further heats the coolant to a fifth temperature. A water pump (not shown), attached to the engine 102, continues to circulate the engine coolant through coolant loop 120 as generally described above. Upon exiting the engine 102, the heated coolant travels via conduit 128 through wall 109 into the interior of the building, and to a coolant-to-water heat exchanger 130. In one embodiment of the present invention, the heat exchanger 130 is a plate-to-plate exchanger. However, other exchangers such as shell and tube, plate and fin, and microchannel exchangers are well within the scope of the present embodiment. There, heat from the coolant, is transferred to water flowing through a water circuit 132, thereby heating the water flowing through the water circuit 132 and cooling the coolant by approximately 15° F. to 25° F., and more preferably approximately 20° F. In one embodiment, the heated coolant typically enters the heat exchanger 130 at a temperature of approximately of about 168° F. and exits the heat exchanger 130 at a lower temperature of approximately 148° F. The engine coolant is then returned to the coolant-cooled alternator 104 of the genset 106 via coolant inlet 134, thereby completing the coolant loop 120.

Referring again to FIG. 1, and specifically the indoor portion of the system 100, assuming liquid that is heated by the mCHP is water, a system is provided for heating the water from the coolant loop, storing the heated water, and heating air with the water in liquid-to-air heat exchanger. The system includes a water pump 137 which is controlled by the controller 101 and pumps water through a water loop 132. In so doing, water is supplied from a bulk hot water storage tank 144 through a conduit 138 and pumped into an inlet 131 of mixing valve 142 regulated by the controller 101. The operating temperature of the genset 106, via the controller 101, regulates mixing valve 142 to control the flow rate of water into and out of the coolant-to-water heat exchanger 130, via conduit 133, which in turn regulates the output temperature of the water that exits the coolant-to-water heat exchanger 130 through outlet 135 and reenters the tank 144. The tank 144 may be a bulk storage tank of any desired capacity as to meet hot water supply needs. Water in the tank 144 may be used primarily as a heat source, as will be described below, or may additionally function as a source of domestic hot water. The tank 144 may include therein one or more water temperature sensors 140. For example, as shown in FIG. 1, three vertically-spaced sensors 140a, 140b, 140c may provide various temperature readings at distinct depths in the tank, which are collectively used to maintain a target temperature within the tank 144. In one embodiment, the target temperature may be 120° F. to 160° F. Furthermore, the controller 101, or another controller communicating with controller 101, may also regulate the variable speed of the engine 102 in response to signals from the sensors 140. For example, the controller 101, or a separate engine controller (if present) may decrease the speed of the engine 102 and as a result generates less electricity as the system 100 approaches the target temperature. In this configuration, the difference between the target temperature and the sensed temperature provided by one or more sensor(s) 140, or an average reading thereof, may serve as a basis for controlling the engine speed. Once the heat load has been met, i.e., the temperature equals the sensed temperature, then the electrical generator 102 is turned off and does not generate electricity. Rather, with the generator 102 in the off configuration, electrical current into the system 100 is supplied by a storage device, e.g., battery, or electrical grid. This current input may also provide the required electricity to start the mCHP genset 106, upon a signal from the controller 101 that the sensed temperature of the hot water storage tank 144 has fallen below the target temperature.

Still referring to FIG. 1, and as described above, the hot water in tank 144 may be used as a heat source, such as in combination with another heating system. In this embodiment, the heating system comprises a forced air furnace 136. Furnace 136 may be a pre-existing unit that is retrofitted to receive heat from mCHP system 100, or may alternatively be a newly provided furnace 136 that is integrated into the mCHP system 100. As is standard, the forced air furnace 136 includes a blower 148 that receives cold air at an inlet 150 from an upstream return duct 152. The blower 148, which may be a variable speed blower, directs airflow through a heat exchanger 157 that receives heat from a conventional gas burner, which may be a one-stage or two-stage burner. When used in system 100, the heat exchanger 157 may function as a second stage or supplemental heat source for the air, and thus may be considered a secondary heat exchanger. The heated air then exits the forced air furnace 136 through the downstream supply duct 154. In one embodiment of system 100, a liquid-to-air heat exchanger, i.e., primary heat exchanger 156, is positioned between the cold air return duct 152 and the blower inlet 150. The heat exchanger 156 may be considered a "primary heat exchanger," the operation of which is supplemented only when necessary by the furnace 136 and more specifically by its supplemental heat exchanger 157. An air filter (not shown) may be disposed within the air flow path upstream of the primary heat exchanger 156 as to prevent dust and/or airborne particulates from covering the primary heat exchanger 156 and reducing its thermal efficiency. In this position, operation of the blower 148 will pull cold air over the primary heat exchanger 156 before the air reaches the blower 148. A water pump 158, the activation of which may be controlled by a conventional furnace thermostat 160, pumps water through a furnace water loop 162. In so doing, water is pulled from an outlet 146 of the bulk hot water storage tank 144 and suppled to an inlet 149 of the primary heat exchanger 156 upon demand, and then return the water to the tank 144 at a lower temperature via inlet 147. In this embodiment, the furnace water loop 162 forms a recirculating closed loop in conjunction with the water circuit 132, which heats the water through operation of the genset 106.

In use, the thermostat 160 will be set to a desired temperature, and control activation of the furnace water loop's 162 water pump 158 and the furnace blower 148. Hot water will then be supplied from the storage tank 144 to the primary heat exchanger 156, positioned upstream of the blower 148, where cold air from the return duct 152 will be heated prior to entering the blower 148. As a result, the temperature of the air that exits the furnace 136 via supply duct 154 will rise. If the heating capacity of the primary heat exchanger 156 is sufficient to meet the demand of the thermostat 160, the secondary heat exchanger 157 of the furnace 136, and its gas burner, then need not operate. The furnace will operate only if the thermal load of the building exceeds the prevailing heating capacity, in terms of BTU output, of the mCHP system 100. The mCHP system 100 and furnace thus form a two-stage heating system, with the mCHP system 100 serving as the primary heat source, supplemented by the furnace 136 as needed. Moreover, as heat is transferred from the water to the air at the primary heat exchanger 156, the sensed temperature at the storage tank 144 will decrease, and may automatically activate the genset 106 to both produce an electrical current output and a thermal output to raise the temperature of water within the storage tank 144 and compensate for heat lost to the air moving over the primary heat exchanger 156. In so doing, operation of the genset 106 may be triggered indirectly by raising the thermostat 160, despite a lack of direct communication between the thermostat 160 and controller 101. However, it should be understood that the value of the second air temperature, i.e., maximum temperature of air independently heated by the primary heat exchanger 156 will vary depending upon various factors, including the volume of air to be heated, blower speed, bulk tank volume, maximum temperature of water in the bulk tank, etc. Nonetheless, it is considered well within the scope of the present invention that in one embodiment the mCHP system 100, including the approximately 8-HP engine 102 as described above, a thermal output of approximately 40,000 to 50,000 BTU may be provide at the primary heat exchanger 156 when the engine 102 is fueled by natural gas and is running at an electrical generation output of approximately 5 kW.

Furthermore, use of the thermostat 160 to activate water pump 158 and supply the water-to-air heat exchanger 156 with hot water may allow the system 100 to be readily retrofitted into an existing forced air heating or HVAC system with an existing thermostat 160 controlled forced air furnace 136, given that the mCHP controller 101 need not be integrated into the thermostat 160. Accordingly, activation of both the primary heat exchanger 156 and secondary heat exchanger 157 may be exclusively and independently controlled by the thermostat 160.

It should be noted that it is conceivable that the system could be configured such that the furnace 136 or other heating system may function as the primary or first stage heater and the mCHP could function as the secondary or second stage heater. It is also possible that, particularly in relatively temperate climates, the furnace 136 or other heating system could be eliminated and all heat provided to forced air heating system could be supplied by the mCHP system 100, with the mCHP's liquid-to-air heat exchange 130 being formed in a flow-path from a blower to the building's warm air supply ductwork.

In an alternative embodiment, the bulk storage tank 144 may serve as a source of domestic hot water for supply to faucets, appliances, etc., In such an embodiment, the water supply may be provided directly from the volume of water in the storage tank 144, where lost water volume is replaced by a cold water supply (not shown). Alternatively, the storage tank 144 may be in fluid communication with yet another water-to-water heat exchanger (not shown), that provides heat to a domestic hot water tank while retaining a closed loop water system with water circuit 132 and furnace water loop 162.

In one embodiment of the present invention, starting the genset 106 is controlled by the microcontroller 101, which allows for a gentler speeding up and starting of the engine 102, thereby reducing fatigue on the engine 102. For example, if the engine 102 is stopped near top dead center of a compression stroke, substantially higher torque would be required to start turning the engine 102 over. The microcontroller 101 may detect the position of the cylinder, for example through the use of a cam sensor, and then reverse the engine 102 approximately ¾ of a cycle, as to reduce the energy required to start the engine near a power stroke.

Figure 2:
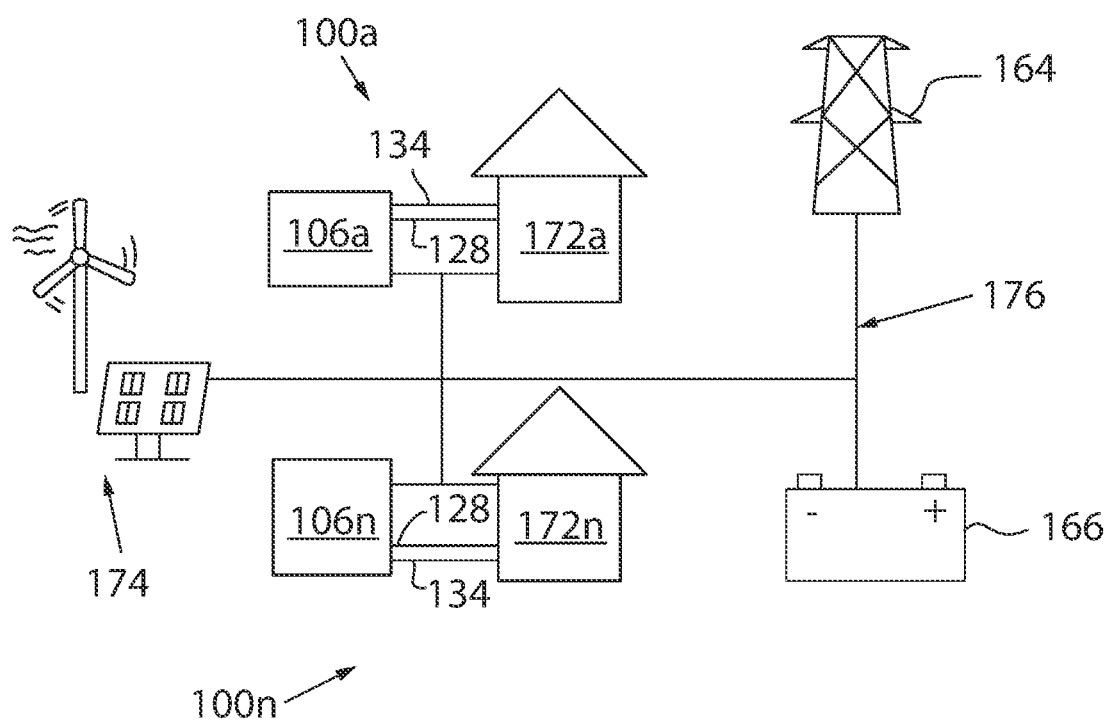
FIG. 2 is a block diagram of a plurality of mCHP systems of FIG. 1 installed within a microgrid.

Referring now to both FIGS. 1 and 2, the mCHP system according to the present invention is well-suited for operation in connection with a power grid 164 or electrical storage device 166 as to provide a current for a genset electric starter (not shown) as regulated by the microcontroller 101, described above. In such an embodiment, an input 168 to the genset 106 may provide the current for the electrical starter, while the electrical current generated by the genset 106 is directed to the building's electrical panel, power grid 164 and/or electrical storage device 166 via current output 170.

The electrical storage device 166 may be either a discrete, single battery, a battery bank or battery array, fuel cells, etc., that is in electrical communication with one or more mCHP system 100a-100n. A number "n" 106a-106n gensets, are schematically illustrated in FIG. 2, to represent a corresponding number "n" 100a-100n mCHP systems in electrical communication with a common electrical storage device 166. In such an embodiment, the electrical storage device 166 can either be used to meet or supplement the electrical load of one or more buildings 172a-172n or optionally to provide current back to a power grid 164 when the generated current exceeds the electrical load and/or electrical capacity of the electrical storage device 166, when the electrical storage device 166 is in electrical communication with the power grid 164.

Furthermore, it should be understood that the present invention need not require a connection to the power grid 164, but may be configured for use off-gird as was shown in FIG. 1. In such an embodiment of the present invention in which the mCHP system 100 is used independent of a conventional electrical grid, excess electricity may be stored for subsequent use in electrical storage device 166.

Referring again to FIG. 2, a mCHP system, shown as 100a, may provide an electrical output to a number "n" of buildings 172a-172n, or alternatively to multiple discrete units (not shown) within a single building. By way of example, a common mCHP system 100a may provide electricity to a multi-tenant apartment building or multi-tenant office building, where the electricity demand of discrete units is independently metered and provided by the common mCHP system 100a. The two or more mCHP systems 100a-100n may operate to provide a combined electrical output sufficient to meet the cumulative electrical load of one or more buildings 172a-172n, as shown in FIG. 2.

Optionally, one or more mCHP systems 100a-100n according to the present invention may provide an electrical power supply in combination with one or more additional electrical generation sources 174, such as solar generated electricity, wind generated electricity, hydrogenated electricity, etc.

In the embodiment of the present invention shown in FIG. 2, including one or more mCHP systems 100a-100n, and optionally one or more additional electrical generation sources 174 such as solar generated electricity, wind generated electricity, hydrogenated electricity etc., the present invention may be integrated into a microgrid 176, i.e., a decentralized group of electricity sources and loads that may function when disconnected from or entirely independent of a central power grid. The microgrid 176 may comprise a plurality of discrete buildings 172a-172n, where each or many buildings include a corresponding mCHP system 100a-100n as generally described above. By way of one non-limiting example, a subdivision of approximately 100 homes may collectively form a microgrid 176 where a mCHP system 100 is installed at each or most of the homes. The various buildings within the microgrid are in electrical communication with one another, such that the electrical current output from a first mCHP system 100a directly connected with a first building 172a may be transmitted to a second building (not shown) that is not directly connected to the first mCHP system 100a. In this configuration, the electricity generation of multiple mCHP systems 100a-100n may be distributed to various buildings in the microgrid as to meet the electrical demand of the microgrid system. Furthermore, excess electricity generated from the various sources within the microgrid 176, which exceeds demand, may be stored for subsequent use in an electrical storage device 166 such as a single battery, a battery array, fuel cells, etc. Alternatively, the excess electricity may optionally be sold back to a central power grid 164, if the microgrid 176 is connected to the central power grid 164 as shown in FIG. 2. In such an embodiment, where the microgrid 176 provides multiple sources of electricity generation, the failure of a single source of electricity generation, such as a single mCHP system 100 will not result in either a loss of electricity at the building (172a for example) associated with the mCHP system 100 or a system-wide failure, as the remaining sources of electricity generation throughout the microgrid may be relied upon to provide continued generation and distribution of electricity.

While particular embodiments of the invention have been shown and described, the spirit and scope are not so limited. For example, while the heating system described herein is a forced air furnace, the mCHP described herein, and other mCHP systems falling within the scope of the invention, could be used in conjunction with other heating systems of the type typically used to heat a building. These heating systems include, but are not limited to, hydronic heating systems and heat pumps. Still other changes and modifications that may be made without departing from the invention in its broader aspects fall within the true spirit and scope of the invention.

What is claimed is:

1. A micro-combined heat and power system, comprising:
an exterior liquid cooled genset that is located outside of a building, the genset comprising an engine and a generator and being configured to output an electrical supply of between approximately between 1.2 kW and 4.4 kW;
a coolant loop that is configured to heat coolant from an initial temperature to an elevated temperature via heat transfer from the genset, the coolant loop extending from the exterior genset to an interior of the building;
a coolant-to-liquid heat exchanger that is disposed within the interior of the building and that is configured to heat liquid disposed within a liquid circuit via heat transfer from the coolant;
another heat exchanger that is disposed in an intake air flow path of a heating system, the heating system having a blower and a secondary heat exchanger disposed downstream of the blower in a direction of intake air flow, wherein the another heat exchanger is positioned upstream of the blower in the direction of intake air flow; and
a pump that is configured, in response to operation of a thermostat that monitors a temperature within the building, to pump the heated liquid through the another heat exchanger to heat intake air in the intake flow path of the heating system.

2. The system of claim 1, wherein the liquid circuit further comprises a liquid storage tank having at least one temperature sensor generating a liquid temperature signal and a controller that is in electrical communication with the at least one temperature sensor and that is configured to receive the liquid temperature signal.

3. The system of claim 2, further comprising a controller-activated liquid valve that is configured to regulate the flow of liquid through the coolant-to-liquid heat exchanger in response to signals from at least one temperature sensor in the liquid storage tank.

4. The system of claim 3, wherein the controller further regulates the activation of the genset in response to the liquid temperature signal from the at least one temperature sensor in the liquid storage tank.

5. The system of claim 4, wherein the engine comprises a liquid cooled variable speed engine configured to be modulated between a running speed of approximately 1,200 RPM and 3,400 RPM.

6. The system of claim 5, wherein the controller regulates the operating speed of the liquid cooled variable speed engine in response to the liquid temperature signal from the at least one temperature sensor in the liquid storage tank.

7. The system of claim 5, wherein the another heat exchanger exchanges up to 50,000 BTU of heat.

8. The system of claim 1, wherein the engine is a duel fuel engine configured to alternatively burn either propane or natural gas.

9. The system of claim 1, wherein the heating system is a forced air furnace, and the another heat exchanger is a liquid-to-air heat exchanger disposed upstream of a blower of the forced air furnace.

10. The system of claim 9, wherein the liquid supplied to the liquid-to-air heat exchanger is water.

11. The system of claim 1, wherein the secondary heat exchanger comprises a gas burner.

12. The system of claim 1, wherein the thermostat further controls activation of the secondary heat exchanger only when a thermal demand of the building exceeds the prevailing heating capacity of the liquid-to-air heat exchanger.

13. The system of claim 1, wherein the genset is in electrical communication with a power grid.

14. The system of claim 1, wherein at least a portion of the electrical power generated by the genset is provided to an electrical storage device.

15. The system of claim 1, wherein the exterior genset is a first exterior genset disposed within a microgrid comprising a plurality of exterior gensets.

16. The system of claim 1, wherein the exterior genset is disposed within an enclosure.

17. The system of claim 1, wherein the coolant loop is further configured to heat coolant from an initial temperature to an elevated temperature via heat transfer from the liquid cooled generator to the coolant.

18. A micro-combined heat and power system, comprising:
- an exterior genset located externally of a building and comprising a variable speed engine and a generator, the variable speed engine being configured to be modulated between a running speed of approximately 500 RPM to 5000 RPM, and the genset being configured to output an electrical supply of between approximately 0.5 kW and 40 kW, the genset having
- a coolant loop that is configured to heat coolant from an initial temperature to an elevated temperature via heat transfer from the genset, the coolant loop extending from the exterior genset to an interior of the building;
- a coolant-to-liquid heat exchanger disposed within the interior of the building and that is configured to heat liquid disposed within a liquid circuit via heat transfer from the coolant in the coolant loop;
- a liquid-to air exchanger that is disposed in an intake air flow path of a forced air furnace system, the forced air furnace system having a blower and a secondary heat exchanger disposed downstream of the blower in a direction of intake air flow, wherein the liquid-to air exchanger is positioned upstream of the blower in the direction of intake air flow; and,
- a pump that is configured, is response to operation of a thermostat monitoring a temperature within the building, to pump the heated liquid through the liquid-to-air heat exchanger to provide intake air in the intake flow path of up to 400,000 BTU of heat.

19. A method of operating the micro-combined heat and power system, comprising the steps of:
- providing an exterior liquid cooled genset located externally of a building and comprising a variable speed engine and a generator;
- using the genset, generating an electrical supply at an electrical output of the generator of between approximately 0.5 kW and 40 kW while modulating the speed of the variable speed engine between a running speed of approximately 500 RPM to 5000 RPM;
- heating coolant disposed within a coolant loop from an initial temperature to an elevated temperature via heat transfer from the exterior liquid cooled genset;
- passing the heated coolant in the coolant loop through a coolant-to-liquid heat exchanger disposed within an interior of the building;
- heating a liquid disposed within a liquid circuit at the coolant-to-liquid heat exchanger via heat transfer from the coolant in the coolant loop; and,
- in response to operation of a thermostat in electrical communication with a thermostat-controlled pump, pumping the heated liquid through a liquid-to-air heat exchanger disposed in an intake airflow path of a forced air furnace located within the building,
- wherein the forced air furnace has a blower and a secondary heat exchanger disposed downstream of the blower in a direction of intake air flow, and
- wherein the liquid-to air exchanger is positioned upstream of the blower in the direction of intake air flow so as to heat intake air, wherein the intake air receives up to 400,000 BTU of heat from the liquid-to-air heat exchanger.

* * * * *